United States Patent
Cathcart et al.

(10) Patent No.: US 9,187,182 B2
(45) Date of Patent: Nov. 17, 2015

(54) METHOD OF CONTROLLING OPERATION OF AN UNMANNED AERIAL VEHICLE

(75) Inventors: Geoffrey Paul Cathcart, Mount Lawley (AU); Terran Ambrose Barber, Mount Hawthorn (AU); David Richard Worth, Shenton Park (AU)

(73) Assignee: ORBITAL AUSTRALIA PTY LIMITED (AU)

( * ) Notice: Subject to any disclaimer, the term of this patent is extended or adjusted under 35 U.S.C. 154(b) by 0 days.

(21) Appl. No.: 14/126,613

(22) PCT Filed: Jun. 29, 2012

(86) PCT No.: PCT/AU2012/000781
§ 371 (c)(1),
(2), (4) Date: Feb. 27, 2014

(87) PCT Pub. No.: WO2013/000035
PCT Pub. Date: Jan. 3, 2013

(65) Prior Publication Data
US 2014/0249694 A1 Sep. 4, 2014

(30) Foreign Application Priority Data
Jun. 29, 2011 (AU) ................................. 2011902554

(51) Int. Cl.
*G06F 19/00* (2011.01)
*B64D 31/02* (2006.01)
*B64D 31/06* (2006.01)
*B64C 39/02* (2006.01)

(52) U.S. Cl.
CPC .............. *B64D 31/02* (2013.01); *B64C 39/024* (2013.01); *B64D 31/06* (2013.01); *B64C 2201/141* (2013.01)

(58) Field of Classification Search
CPC ..... G05D 1/00; G05D 1/0061; G05D 1/0088; G05D 1/0076; B64C 19/00; B64B 1/02
USPC ...................... 701/11, 13, 36, 24, 2; 244/75.1
See application file for complete search history.

(56) References Cited

U.S. PATENT DOCUMENTS

| 5,429,089 A | 7/1995 | Thornberg et al. |
| 6,154,693 A * | 11/2000 | Aberschitz et al. ............. 701/16 |
| 7,343,232 B2 * | 3/2008 | Duggan et al. .................. 701/24 |
| 7,693,624 B2 * | 4/2010 | Duggan et al. .................. 701/24 |
| 7,778,744 B2 | 8/2010 | Rath et al. |
| 8,135,503 B2 * | 3/2012 | Parras ............................. 701/16 |

(Continued)

OTHER PUBLICATIONS

International Search Report from the Australian Patent Office for International Application No. PCT/AU2012/000781 mailed Aug. 29, 2012.

(Continued)

*Primary Examiner* — McDieunel Marc (57) ABSTRACT

This disclosure describes a method of controlling operation of an unmanned aerial vehicle (UAV) having a flight control system comprising: a flight controller for implementing a flight control strategy; and an engine control unit interfaced with the flight controller for controlling engine operation. An engine speed target is set for the flight control system in response to one or more signals communicated by the flight controller to the engine control unit which controls engine operation to achieve the engine speed target by closed loop control over fueling without requiring throttle position control.

31 Claims, 4 Drawing Sheets

(56) References Cited

U.S. PATENT DOCUMENTS

| | | | |
|---|---|---|---|
| 8,234,068 B1* | 7/2012 | Young et al. | 701/528 |
| 2009/0152391 A1* | 6/2009 | McWhirk | 244/30 |
| 2010/0152933 A1 | 6/2010 | Smoot et al. | |
| 2011/0071707 A1 | 3/2011 | Crumm et al. | |
| 2011/0264314 A1* | 10/2011 | Parras | 701/16 |
| 2012/0123628 A1* | 5/2012 | Duggan et al. | 701/24 |

OTHER PUBLICATIONS

International Preliminary Report on Patentability from the Australian Patent Office for International Application No. PCT/AU2012/000781 mailed Sep. 26, 2013.

* cited by examiner

METHOD OF CONTROLLING OPERATION OF AN UNMANNED AERIAL VEHICLE

CROSS-REFERENCE TO RELATED APPLICATIONS

This application is a U.S. national stage filing under 35 U.S.C. §371 of International Application No. PCT/AU2012/000781, filed Jun. 29, 2012, entitled "Method of Controlling Operation of an Unmanned Aerial Vehicle."

This invention relates to a method of controlling operation of an unmanned aerial vehicle (UAV).

UAVs have increasing application for defense and security applications including surveillance. They are also used for a range of other purposes in surveying and mineral exploration. UAVs are typically propelled by a propeller or prop having a drive shaft engaged with an engine of the UAV, the engine being controlled, typically in part, by an engine control unit.

UAV flight control systems involve remote control over the operation of the flying device which may be of various designs. Fixed wing types, helicopter types and hybrid types are known. Remote control is typically performed by a computer (or autopilot) or human operator ("remote controller") communicating with a, typically electronic, flight controller onboard the flying device. The remote controller may be on the ground. The flight controller then controls operation of the UAV engine in accordance with the following strategy.

Typically, the remote controller will require the UAV to fly at a target altitude and correction of error between that target altitude and actual measured altitude dictates the flight control strategy. Actual altitude is measured by an altitude sensor which sends its output signal to the flight controller for comparison with the target altitude. If there is any error between actual and target altitudes, current flight controllers use a servo motor to adjust the throttle position of the UAV engine in proportion to altitude error. This in turn results in a change in engine speed, that is, prop speed, to reduce the altitude error. Such a flight control strategy bypasses the engine control unit, the flight controller directly adjusting the throttle position.

However, throttle position based flight control strategies provide a coarser more indirect control over altitude than is desirable for certain UAV operations. Further, such a flight control strategy requires that the flight controller account for differences in engine type and performance associated with the conversion of throttle position to engine torque output and prop speed. Such accounting for differences, and the resulting indirect control over engine operation, introduces inaccuracies preventing a fine degree of control and more complex control methodology to compensate for such inaccuracies.

U.S. Pat. No. 7,778,744 discloses a modular avionics system for a UAV having a control module that executes flight control and vertical and lateral guidance algorithms to generate control commands. A data link module communicates with a remote control station and receives control commands from the remote control station. A data acquisition module communicates with the control module and the data link module. The data acquisition module is configured to receive and process data from one or more onboard sensors and to actuate a plurality of servo motors in response to control commands. In U.S. Pat. No. 7,778,744, the throttle servo is controlled by the flight controller to achieve an engine speed. There is no mention of engine speed target setting or mechanisms for maintaining the engine speed.

U.S. 20100152933 discloses a proximity detector, UAV and method for outputting a displacement. The proximity detector includes a velocity sensor, a displacement sensor and integration logic. The displacement (distance) sensor controls distance of the UAV from the ground or other objects.

U.S. 20110071707 discloses an aerial vehicle configured to operate in a base fuel cell operating mode and a fuel cell boost operating mode. A method for controlling the aerial vehicle includes providing a base fuel cell upper power limit. As is evident from mention of fuel cells and an electric motor, there is no engine per se in this system and engine speed control is not disclosed.

It would therefore be desirable to develop a different method of controlling operation of a UAV which overcomes one or more of the aforementioned problems.

With this object in view, the present invention provides—in one embodiment—a method of controlling operation of an unmanned aerial vehicle having a flight control system comprising:
   a flight controller for implementing a flight control strategy; and an engine control unit interfaced with said flight controller for controlling engine operation;
   wherein an engine speed target is set for said flight control system in response to one or more signals communicated by said flight controller to said engine control unit which controls engine operation to achieve said engine speed target.

In another embodiment, the present invention provides a system for operating an unmanned aerial vehicle having a flight control system comprising:
   a flight controller for implementing a flight control strategy; and
   an engine control unit interfaced with said flight controller for controlling engine operation
   wherein said flight control system includes means for setting an engine speed target in response to one or more signals communicated by said flight controller to said engine control unit which includes engine speed control means for controlling said engine to achieve said engine speed target.

The engine speed target may be set directly. However, the engine speed target could also be set by the flight control system taking account of signals corresponding to other UAV operational parameters. Such parameters may particularly include, though without limitation, target altitude and target air speed of the UAV. In such cases, the flight controller or remote controller could set a target for an operational parameter, such as altitude or air speed and relay this to the engine control unit. The engine control unit would then set (following appropriate processing involving calculation, use of look-up maps and so on) the engine speed target in response to demand altitude, air speed or both.

Target engine speed may be set for the flight control system by a remote controller (such as ground control/autopilot), by calculation by computer or by demand by a human operator, with corresponding signals then being communicated to the flight controller, for example by wireless link. Alternatively, the desired target engine speed may be set or calculated by the flight controller itself, potentially autonomously. In such case, the engine speed target may be set dependent on signals corresponding with parameters such as target altitude and/or target engine speed. The target engine speed is treated as a demand for the engine control unit, the flight controller relaying target signals to the engine control unit, to which it is interfaced, for example through an analogue or controller area network (CAN) or CAN-bus link. The engine control unit would then respond by setting the target engine speed.

The engine speed target is usually and conveniently set to control altitude of the UAV. To that end, the engine or prop speed target is calculated with reference to, or in proportion to, a target altitude for the UAV and to reduce error between target altitude and measured altitude. Therefore, altitude error may be included in the calculation. A target air speed, as opposed to target prop speed, may also usefully be included in the calculation of target prop speed, advantageously by the engine control unit.

The method and system both implement closed loop control over engine speed so current or actual engine speed is measured and compared with the engine speed target. If there is an error between actual engine speed and engine speed target, the engine control unit operates the engine to reduce or correct the engine speed error. The engine control unit may control one or more engine parameters selected from the group consisting of fuelling rate, fuelling timing, injection timing and ignition timing to correct engine speed error. Advantageously, control over fuelling rate, fuelling timing, injection timing and ignition timing is implemented to reduce engine speed error. Corrections, from base values, of the selected parameters stored in engine control unit maps are calculated and used to implement closed loop engine speed control.

Throttle position may or may not be controlled to correct engine speed error. If throttle position control is required, the engine control unit controls throttle position by controlling a throttle servo motor. Pulse width modulation (PWM) control over throttle position is advantageous. However, throttle servo motor control over speed should be used in combination with control over the other parameters mentioned above, particularly fuelling rate, fuelling timing, injection timing and ignition timing to achieve the desired accurate control over engine speed and UAV altitude. The preferred engine type for use in the UAV, which provides particularly advantageous control over the fuelling rate and fuelling timing, is described below. Such engine may be controlled, through closed loop control over fuelling independently of throttle position (which remains unchanged). This enables a coarser control strategy. However, a finer control strategy in which throttle position is adjusted as part of the fuelling control strategy is also possible.

The engine speed control improvement is achieved under both steady state and transient conditions and throughout the engine operating load range, not only at low load conditions such as idle.

UAVs are typically propeller or "prop" driven and a pusher prop may conveniently be adopted for generating thrust. However, there are alternatives including tractor prop arrangements and fan drivers such as ducted fans or rotors. The engine speed target may be set as propeller or "prop" speed. Some UAV types include rotors or a plurality of rotors for generating thrust. It is to be understood that the method of operation described herein applies equally to those UAV types where rotor speed would be the engine speed target.

The flight controller may be interfaced with the engine control unit in a number of ways. In one embodiment, interfacing is achieved using a controller area network ("CAN") or CAN bus link.

The engine is advantageously a spark ignited fuel injected engine of two or four stroke type. Compression ignition engines could be used though these tend to be heavier, for a given capacity, than spark ignited engines. The use of lighter weight spark ignition engines, even those able to run on heavier fuels, is advantageous resulting in fuel savings.

Fuel injector(s) may be provided, for example, in a combustion chamber of a cylinder of the engine (direct injection or DI system), an intake manifold (MPI injection) of the engine or in a port (PI injection) of the engine. Combinations of these such as PUDI fuel injection systems may be used. Fuel injection systems have a number of benefits including reduced fuel consumption and reduced emissions. Particularly preferred are dual fluid direct injection systems, especially those operated with lean air fuel ratios ($\lambda > 1$) for reducing fuel consumption.

Dual fluid fuel injection systems have proved efficient at providing good control over engine operation in automotive, marine and UAV contexts. The metering of the fuel, the timing of the air injection or delivery event and the timing of ignition can be finely adjusted in response to engine speed, engine load and other prevailing engine operating conditions. As a result, the engine can be operated efficiently, and can facilitate running with heavy fuels. DI systems are particularly strongly associated with stable engine combustion.

In the present context, where the engine is provided with a dual fluid injection system, the engine control unit controls the fuel metering injector to meter a quantity of fuel set with reference to the engine speed target and potentially independently of throttle position (the throttle position not being changed to achieve the desired fuelling control). This fuel is then delivered by fuel injector(s) to the UAV engine at controlled fuel injection timing. As stated above, dual fluid injection systems are also suitable for combustion of heavy fuels, such as kerosene fuels (JP5, JP8) as preferred in various military applications. Engine speed control of two stroke engines with direct injection fuel systems capable of stable stratified combustion can be achieved using closed loop fuelling control. In this case, when operating at part loads with lean air fuel ratios ($\lambda > 1$), to improve fuel economy, change in fuelling will result in a change in engine torque (and more particularly torque acting on the driveshaft for the prop) and hence a change in engine speed. This form of engine speed control can occur independently of throttle position control.

The engine control unit may be provided with an input that defines no load (idle) or a minimum engine speed input distinctly from an engine speed target as set, for example, to achieve a target altitude. Whilst this may still be considered an engine or prop speed target it serves different roles. The no load input could be used in conditions such as start up (cranking), as a request to the engine to immediately go to minimum speed (say an idle speed) or as a sign that there is no engine speed target set for achieving target altitude. Two methods could be used to implement such input. First, the input may be an independent input such as an idle switch. Second, the input may be inferred from the speed demand input indicating a low or no load demand, typically idle demand.

The engine control unit may enable controlled engine start sequences based on engine speed feedback and engine speed target. When the measured engine speed changes from zero to a positive value, representative of cranking speeds (from a starter motor or similar), the engine control unit may perform a controlled engine start sequence and control the engine speed to idle speed irrespective of the engine speed target. This prevents engine speeds, i.e. prop speeds, that could result in vehicle motion or flight directly following the engine start sequence. The engine control unit allows transition from the idle (no load) state only after the engine speed target has been returned to the no-load condition.

Another special case concerns engine stall speed. The engine control unit should control engine speed to prevent engine stall conditions. Closed loop control is modified where engine speed target falls below a predetermined margin from engine stall speed. In this case, the engine control unit controls engine speed above engine stall speed.

The method and system can also allow for fault management in the event of certain component faults leaving the UAV, throttle servo motor and its engine otherwise in operational condition. In case of such fault, the method and system allow at least two alternative fault management strategies. First, and for example, in the event of a fault in throttle position sensor, an engine control unit command signal to the throttle servo motor may be used to infer the throttle position as an alternative or proxy input to sensed throttle position. This is because, where the throttle servo motor is operating normally, the engine control unit command signal bears a close relationship to throttle position. Alternatively, control can be returned from the flight control system to direct control over operation of throttle servo motor by either of the flight controller and remote controller. The latter option may be adopted in any case where a fault occurs in flight control system but the engine and UAV remain otherwise in operational condition.

The flight control system may implement a stepped airflow control strategy as an alternative to throttle servo motor control by the engine control unit, with closed loop fuelling control being used to provide a finer control over air fuel ratio ($\lambda$). In one embodiment, solenoid control—preferably involving use of solenoid(s) corresponding with particular air flow ranges—could be employed to provide a predetermined number of coarse independent air flow ranges. For example, 2-3 solenoid combinations could be used to provide 3 coarse independent air flow ranges with closed loop fuelling control, being used to provide finer AFR control.

Such stepped airflow control is also an option in the event of failure of the throttle servo motor. In such case, an air throttle bypass valve, conveniently a solenoid, can be provided in the flight control system. This air throttle bypass valve is normally closed. However, if the throttle servo motor fails, a fault signal may be sent to the engine control unit which then opens the air throttle bypass valve to provide sufficient airflow to enable the UAV to "limp home" with closed loop fuelling control only.

The method and system, based on an engine speed target (set either directly or in response to parameters such as target air speed and target altitude) and not a throttle position target, provides more accurate, that is finer resolution, control over engine speed because it is no longer necessary for the flight controller to adapt for different engine type and performance. Direct, rather than indirect, control over engine speed is implemented by replacing a throttle position target with the engine speed target as the basis for control. By allowing the engine control unit to use an engine speed target as directly set by the flight control unit or the operator of the flight control unit, improved engine speed control and UAV performance results.

At the same time, engine or prop speed has a more rapid response to control action by the engine control unit and provides greater certainty and greater stability to remote UAV controllers about operation of the engine or prop.

The method and system may enable the engine control unit, advantageously in accordance with a full torque model, to control engine speed (and other parameters) taking into account a range of engine operating conditions. Such conditions may include engine temperature and outside air temperature.

The method and system of the invention may be more fully understood from the following description of preferred embodiments thereof made with reference to the accompanying drawings in which.

Figure 1:
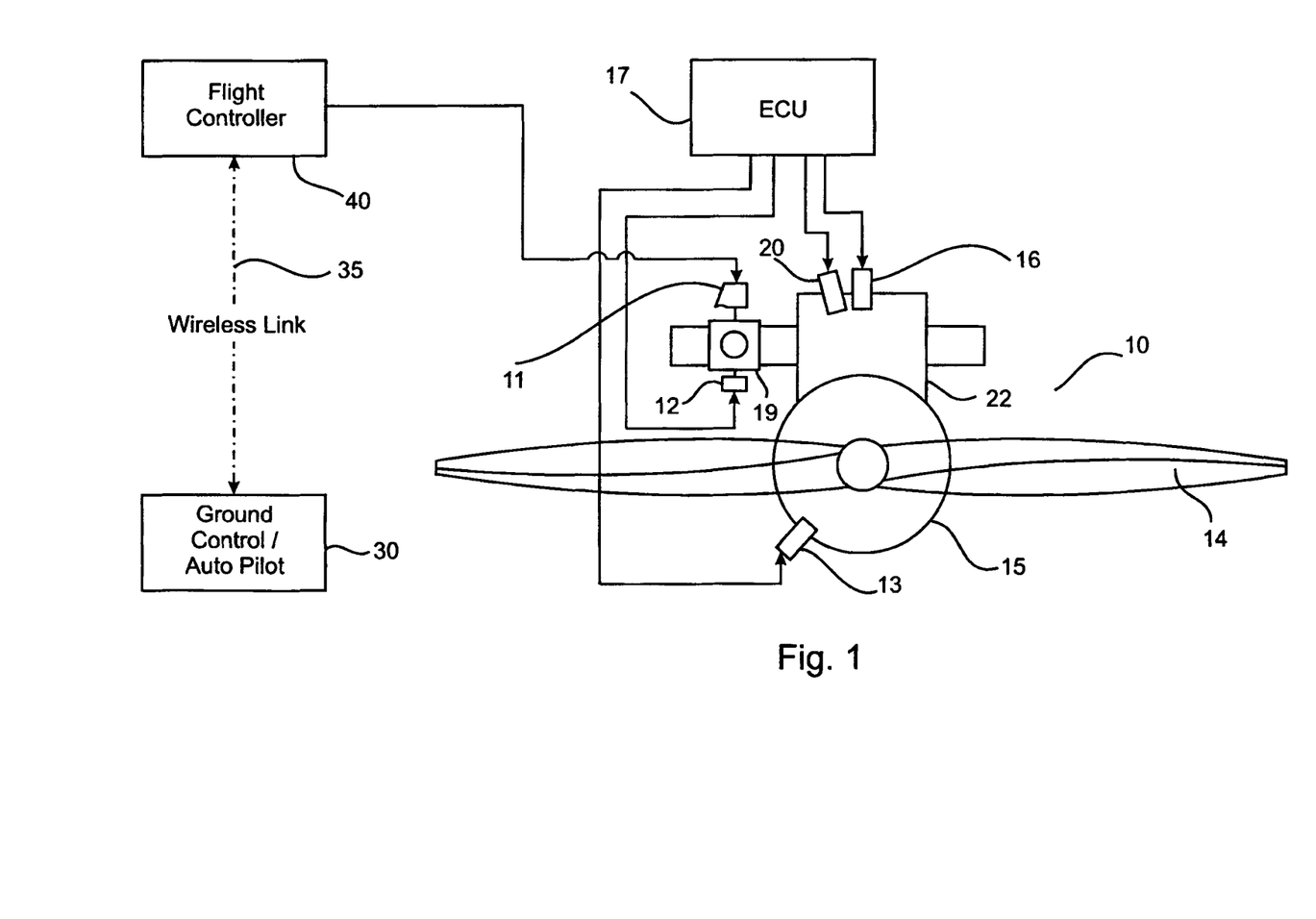
FIG. 1 is a schematic of a prior art UAV flight control system.

Referring first to FIG. 1, the prior art UAV flight control system 10 includes a remote controller (ground control/autopilot) 30, a flight controller 40 and an engine control unit 17. Remote controller 30 communicates with flight controller 40 by a wireless link 35. Commands for operation of the UAV are sent through this wireless link. The engine control unit ("ECU") 17 controls, in part, operation of engine 15 for driving prop 14, conveniently of pusher type. Engine 15 is fuel injected, whether direct or port injected, using fuel injector 20.

ECU 17 sets timings for fuel injection timing and ignition timing events, in the crank domain, using signals obtained from angular or crank position sensor 13. Fuel injector 20 delivers fuel, at fuel delivery event timings set by ECU 17, such that an air fuel charge is established in a cylinder 22 of the engine 15. This charge is ignited by spark plug 16 at an ignition timing also set by ECU 17.

The flight controller 40 controls operation of engine 15 so far as position of throttle 19 as sensed by throttle position sensor 12 is concerned, adjusting position of the throttle 19 by controlling operation of throttle servo motor 11 where required for altitude control. The flight control strategy is described below. However, it is to be understood that the ECU 17, whilst receiving throttle position sensor 12 signals—as a load input for controlling fuel injection system and ignition events—does not control operation of the throttle servo motor 11. Only flight controller 40 has authority over operation of the throttle servo motor 11. The ECU 17 is, though controlled by the flight controller 40, only controlled indirectly through the throttle 19 position as set by flight controller 40. Other than this, the ECU 17 operates the engine 15 essentially independently of the flight controller 40.

Figure 2:
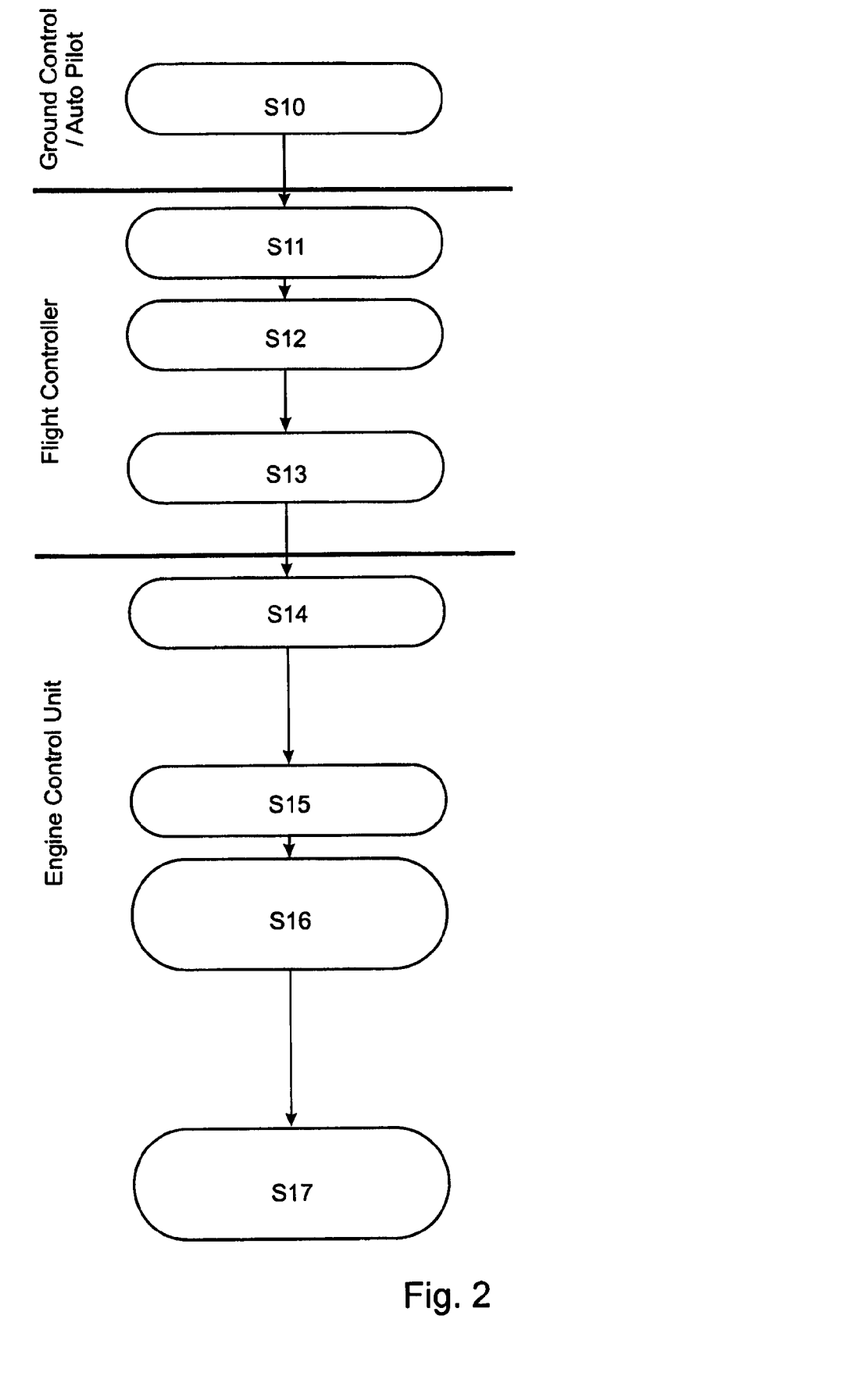
FIG. 2 is a flow chart showing the steps in the control strategy for the prior art UAV flight control system shown in FIG. 1.

The control strategy for this UAV flight control system 10 is described, with reference to FIG. 2, as follows.

In step S10, remote controller 30 sets a UAV target altitude and sends this through the wireless link 35 to flight controller 40.

In step S11, an altitude sensor (not shown and which may be ground based under control of remote controller 30) measures actual UAV altitude and sends a voltage signal representative of actual altitude to flight controller 40.

In step S12, flight controller 40 compares a target altitude to the measured altitude and determines whether there is an altitude error.

In step S13, if there is an altitude error between target altitude and measured altitude, the flight controller 40 drives the throttle servo motor 11, connected to blade of throttle 19, to adjust the throttle 19 in proportion to the altitude error. If measured altitude is below target altitude, throttle 19 is proportionally opened by throttle servo motor 11. If measured altitude is above target altitude, throttle 19 is proportionally closed by throttle servo motor 11.

In step S14, current engine or prop speed is calculated by ECU 17 using signals provided by crank position sensor 13 in conventional manner. In step S15, current throttle 19 position is sensed by throttle position sensor 12.

Steps S14 and S15 could hence be performed in parallel, that is simultaneously or very near simultaneously as both current prop speed and current throttle position are obtained using different sensors 12 and 13.

In step S16, fuel injection timings for fuel injector 20 and ignition timings for spark plug 16 are obtained from ECU 17 maps which relate these timings to current prop speed and throttle position.

In step S17, the engine 15 is controlled by ECU 17 in accordance with the fuel injection and ignition timings obtained from the above noted ECU 17 maps.

This flight control strategy provides generally acceptable control over UAV flight. However, flight controller 40 control over prop speed and altitude is indirect, resulting in slower response times and coarser altitude resolution than desirable. The flight control strategy also leaves uncertainty concerning UAV operation for human operators of the UAV. At the same time, such a flight control strategy requires that a flight controller 40 be programmed to account for differences in engine type and performance associated with the conversion of throttle position to engine torque output and prop speed. Such accounting for differences introduces inaccuracies preventing a fine degree of control and more complex control methodology to compensate for such inaccuracies.

The method and system of one embodiment of the present invention will now be described with reference to FIGS. 3 and 4.

Figure 3:
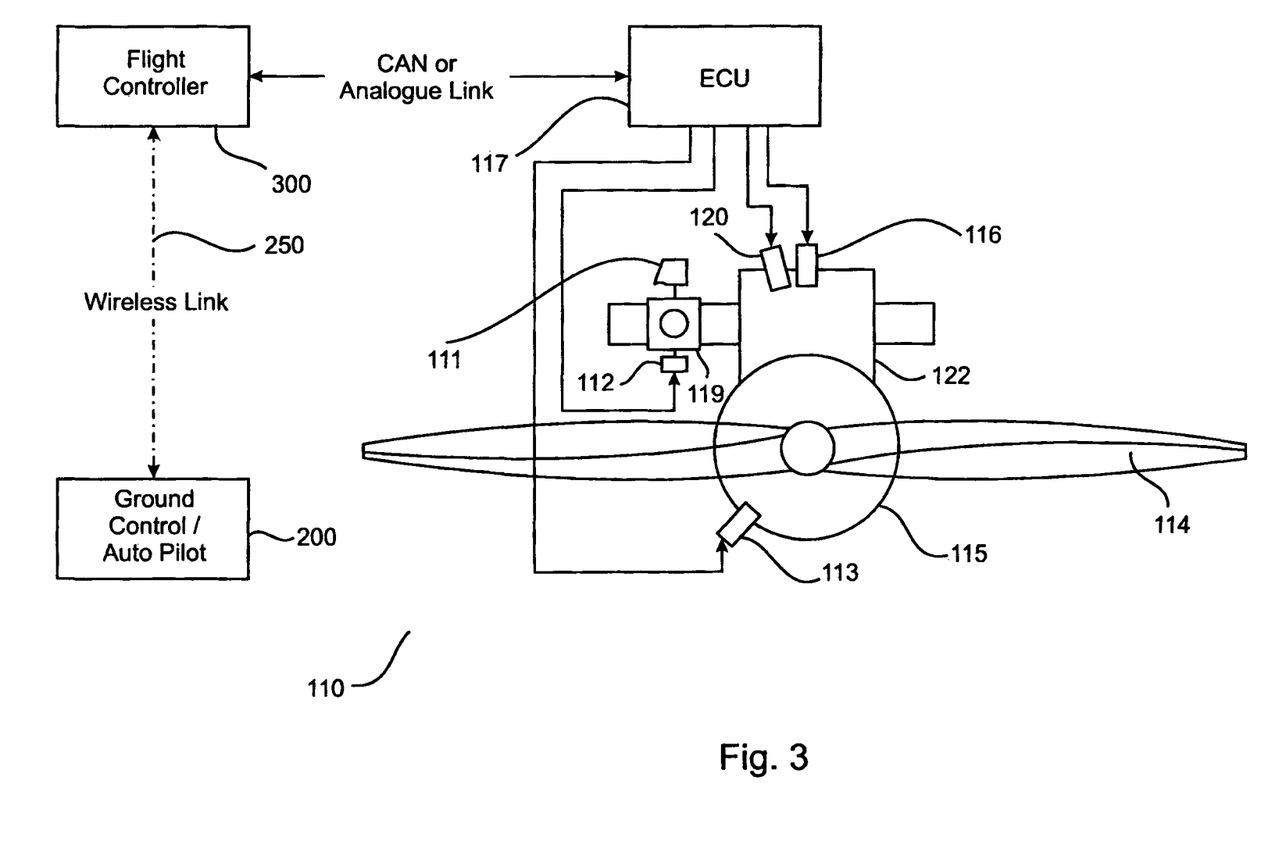
FIG. 3 is a schematic of a UAV flight control system for operating a UAV in accordance with one embodiment of the method of the present invention.
Figure 4:
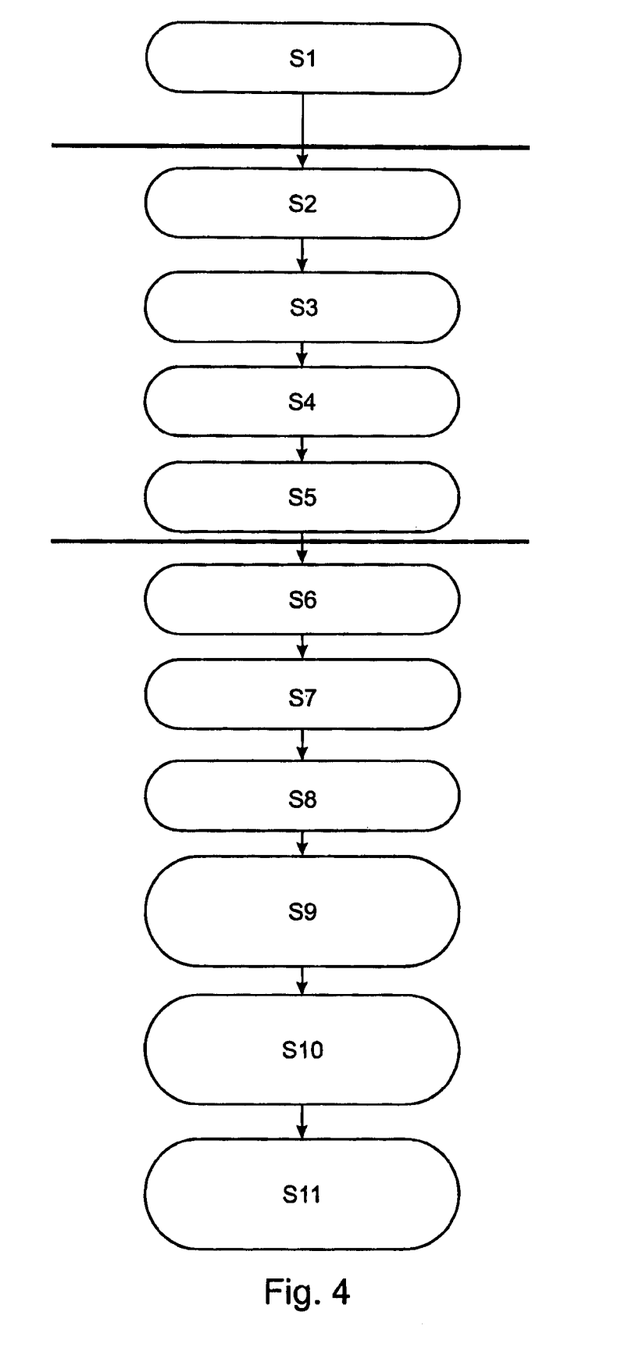
FIG. 4 is a flow chart showing the steps in the control strategy for the UAV flight control system shown in FIG. 3.

The UAV flight control system 110, as shown in FIG. 3, includes a remote controller (ground control/autopilot) 200, a flight controller 300 and an engine control unit 117. Remote controller 200 communicates with flight controller 300 by a wireless link 250. Commands for operation of the UAV are sent through this wireless link 250. Flight controller 300 is, in this case, interfaced with the engine control unit ("ECU") 117 which controls operation of engine 115, in accordance with a flight control strategy set for the flight controller 300 for driving prop 114, conveniently of pusher type. Flight controller 300 is interfaced with ECU 117 by a controller area network ("CAN") or CAN-bus or analogue link which allows operational commands and information, notably in this case engine speed, to be rapidly transferred in either direction between the two controllers 300 and 117. Flight controller 300 has a central and direct role in controlling flight control strategy through control over operation of engine 115.

Engine 115 is fuel injected, whether direct or port injected, using fuel injector 120. The fuel injector 120 forms part of a dual fluid fuel injection system.

ECU 117 sets timings for events such as fuel metering and fuel injection timing and ignition timing, in the crank domain, using signals obtained from angular or crank position sensor 113. Fuel injector 120 delivers fuel, at fuel delivery event timings set by ECU 117, such that an air fuel charge is established in a cylinder 122 of the engine. This charge is ignited by spark plug 116 at an ignition timing also set by ECU 117.

The control strategy for this UAV flight control system 10 is described, with reference to FIG. 4, as follows.

In step S1, remote controller 200 sets a UAV target altitude and sends this through the wireless link 250 to flight controller 300.

In step S2, an altitude sensor (not shown and which may be ground based under control of remote controller 200) measures actual UAV altitude and sends a voltage signal representative of actual altitude to flight controller 300.

In step S3, flight controller 300 compares a target altitude to the measured altitude and determines whether there is an altitude error.

In step S4, engine or prop speed target is set by remote controller 200 or flight controller 300 being calculated in proportion to voltage signals corresponding with UAV operational parameters including target altitude, actual altitude and target air speed for the UAV. However, it is to be understood that engine speed target could be set directly by remote controller 200 or flight controller 300 without reference to the altitude and air speed for the UAV.

In step S5, prop speed target, however set, is sent by flight controller 300 to ECU 117. The flight controller 300 does not have direct control authority over throttle servo motor 111.

In step S6, current prop speed is calculated by ECU 117 using signals provided by crank position sensor 113 in conventional manner.

In step S7, if there is an error between target prop speed and current prop speed, the flight controller 300 drives the throttle servo motor 111, connected to blade of throttle 119, to adjust the position of throttle 119 in proportion to the prop speed error. If measured prop speed is below target prop speed, throttle 119 is proportionally opened by throttle servo motor 111 responding to a control signal, conveniently of PWM type from ECU 117. If measured prop speed is above target prop speed, throttle 119 is proportionally closed by throttle servo motor 111. Alternatively, the ECU 117 could calculate a closed loop correction to base throttle position, based on the prop speed error, and adjust throttle 119 position accordingly.

In step S8, current throttle 119 position is measured by throttle position sensor 112 to be used as an input to ECU 117 following the closed loop engine speed control strategy. In the event of a fault in throttle position sensor 112, one of at least two alternative "limp home" strategies may be adopted. First, ECU 117 command or PWM signal, to the throttle servo motor 111 may be used to infer the throttle position and used as an alternative or proxy input to sensed throttle position. This is because, where the throttle servo motor 111 is operating normally, the previously described PWM signal bears a close relationship to throttle position. Alternatively, control can be returned from flight control system 110 to direct control over operation of throttle servo motor 111 by flight controller 300 or remote controller 200. The latter option may be adopted in any case where a fault occurs in flight control system 110 but the engine and UAV remain otherwise in operational condition.

In step S9, ECU 117 looks up event timings including base fuel injector 120 opening timings and spark plug 116 ignition timing in maps which provide these event timings, for an engine cycle, as a function of current prop speed and throttle 119 position.

In step S10, ECU 117 calculates closed loop prop speed corrections to the fuel injector 120 opening timing and spark plug 116 ignition timing. Throttle position could be taken into account or corrected in similar manner. All corrections are calculated to reduce prop speed error.

In step S11, engine 115 is controlled by ECU 117 using the sum of the base fuel injector 120 opening timing and spark plug 116 ignition timing and closed loop prop speed corrections as calculated in step S10.

The ECU 117 may enable controlled engine start sequences based on engine speed feedback and engine speed target. When the measured engine speed changes from zero to a positive value, representative of cranking speeds (from a starter motor or similar), ECU 117 may perform a controlled engine start sequence and control the engine speed to idle speed irrespective of the engine speed target. This prevents engine speeds, i.e. prop speeds, that could result in vehicle motion or flight directly following the engine start sequence. ECU 117 allows transition from the idle (no load) state only after the engine speed target has been returned to the no-load condition.

Another special case concerns engine stall speed. ECU 117 controls engine speed to prevent engine stall conditions.

Closed loop control is modified where engine speed target falls below a predetermined margin from engine stall speed. In this case, the ECU 117 controls engine speed above engine stall speed.

If engine 115 is selected to be a two stroke engine with a direct injection fuel system capable of stable stratified combustion, prop 114 speed control can be achieved using closed loop fuelling control. In this case, when operating at part loads with lean air fuel ratios ($\lambda>1$), to improve fuel economy, change in fuelling, through varying metered quantity of fuel and fuel delivered through fuel injector 120 in fuel delivery event(s), will result in a change in engine torque (and more particularly torque acting on the driveshaft for the prop 114) and hence a change in prop speed. This form of engine speed control can occur independently of throttle position control with engine speed being controlled by the ECU 117 without change of throttle position. That is, steps S7 and S8 from the above control strategy can be omitted and step S9 modified to omit consideration of throttle 119 position.

The flight control system 110 has good air fuel ratio (AFR) tolerance. Therefore, a stepped airflow control strategy could be adopted, as an alternative to throttle servo motor 111 control by ECU 117 (i.e drive by wire (DBW) control over airflow), with closed loop fuelling control being used to provide a finer control over AFR. In one embodiment, solenoid control—preferably involving use of solenoid(s) corresponding with particular air flow ranges—could be employed to provide a predetermined number of coarse independent air flow ranges. For example, 2-3 solenoid combinations could be used to provide 3 coarse independent air flow ranges with closed loop fuelling control, being used to provide finer AFR control.

Such non-DBW airflow control, using solenoids, is also an option in the event of failure of the throttle servo motor 111. In such case, an air throttle bypass (ATB) solenoid can be provided in the flight control system 110. This ATB solenoid is normally closed. However, if throttle servo motor 111 fails, a fault signal is sent to ECU 117. ECU 117 then opens the ATB solenoid to provide sufficient airflow to enable the UAV to "limp home" with closed loop fuelling control only.

An option for the above described flight control system 110 is to have the flight controller 300, CAN link and ECU 117 configured to allow redundancy in communications between engine control unit 117 and other modules on the CAN link, most especially flight controller 300. This provides assurance in case a communications link fails, likely resulting in loss of the UAV. To this end, ECU 117 could be provided with two or more independent input and output CAN circuits. Flight controller 300 could be provided with one or more independent input and output CAN circuits. ECU 117 may use all CAN circuits to transmit and receive each message. Each CAN circuit has a unique and identifiable address such that the ECU 117 and the flight controller 300 can identify which CAN circuit is transmitting or receiving each message through the CAN link.

Flight controller 300 will listen for messages from both ECU 117 CAN output circuits. A fault message will be sent back to the ECU 117 if the flight controller 300 does not receive the same message from both ECU 117 CAN circuits. By analyzing received messages, the flight controller 300 may be able to identify the failed CAN input. If a fault message is sent, flight control system 110 will continue to operate using the working ECU 117 CAN circuit.

ECU 117 will listen for messages from the flight controller 300 using both ECU 117 CAN circuits. If an incoming message is not received by both CAN circuits, then a fault is diagnosed indicating which CAN circuit did not receive the message and thus is in fault. If a fault message is sent, the flight control system 110 will continue to operate using the working ECU 117 CAN circuit.

Modifications and variations to the method of operating an unmanned aerial vehicle, as described in this specification, may be apparent to the person skilled in the art. Such modifications and variations are deemed within the scope of the present invention.

The invention claimed is:

1. A method of controlling operation of an unmanned aerial vehicle (UAV) having a flight control system comprising:
   a flight controller for implementing a flight control strategy; and
   an engine control unit interfaced with said flight controller for controlling engine operation,
   wherein an engine speed target is set for said flight control system in response to one or more signals communicated by said flight controller to said engine control unit which controls engine operation to achieve said engine speed target by closed loop control over fuelling without requiring throttle position control.

2. A method as claimed in claim 1 wherein said engine speed target is set for the flight control system by said flight controller, a remote controller, by calculation by computer or by demand by a human operator and then communicated to said flight controller.

3. A method as claimed in claim 1 wherein said engine speed target is set to control altitude of the UAV, said engine speed target being calculated with reference to, or in proportion to, a target altitude for the UAV and to reduce error between target altitude and measured altitude.

4. A method as claimed in claim 3 wherein said engine speed target is calculated with reference to a UAV operational parameter input to the engine control unit and including at least one of a target air speed and a target altitude.

5. A method as claimed in claim 1 implementing closed loop control over engine speed with actual engine speed being measured and compared with the engine speed target; and, if there is an error between the actual engine speed and the engine speed target, the engine control unit operates the engine to reduce or correct the engine speed error.

6. A method as claimed in claim 5 wherein said engine control unit controls at least one engine parameter selected from the group consisting of fuelling rate, fuelling timing, injection timing and ignition timing to correct engine speed error.

7. A method as claimed in claim 6 wherein said engine control unit additionally controls a throttle position to correct engine speed error.

8. A method as claimed in claim 7 wherein said engine control unit controls the throttle position by controlling a throttle servo motor.

9. A method as claimed in claim 8 wherein, in the event of a fault, an engine control unit command signal to the throttle servo motor is used to infer the throttle position and used as an alternative or proxy input to sensed throttle position.

10. A method as claimed in claim 9 wherein, in the event of the fault, control is returned from flight control system to direct control over operation of the throttle servo motor by the flight controller or a remote controller.

11. A method as claimed in claim 8 wherein said flight control system includes an air throttle bypass valve and, if the throttle servo motor fails, said engine control unit opens the air throttle bypass valve to provide sufficient airflow to enable the UAV to "limp home" with closed loop fuelling control only.

12. A method as claimed in any one of claims 5 to 8 wherein engine speed is controlled under both steady state and transient conditions and throughout the engine operating load range.

13. A method as claimed in any one of claims 1 to 8 wherein said engine speed is set as a prop speed or rotor speed target.

14. A method as claimed in any one of claims 1 to 8 wherein said engine is a spark ignited fuel injected engine of two or four stroke type.

15. A method as claimed in claim 14 wherein said engine is injected with fuel by a dual fluid direct injection system.

16. A method as claimed in claim 15 wherein said engine is operated with lean air fuel ratios ($\lambda > 1$) for reducing fuel consumption, preferably under part load conditions.

17. A method as claimed in claim 15 wherein said engine control unit controls a fuel metering injector to meter a quantity of fuel set with reference to the engine speed target.

18. A method as claimed in claim 17 wherein said engine combusts a heavy fuel, preferably a kerosene fuel.

19. A method as claimed in claim 15 wherein said dual fluid injection system implements stable stratified combustion using closed loop fuelling control.

20. A method as claimed in claim 1 wherein said engine control unit is provided with an input that defines no load (idle) or a minimum engine speed input distinctly from said engine speed target.

21. A method as claimed in claim 20 wherein said no load input is used in start up (cranking) conditions and said minimum speed is an idle speed.

22. A method as claimed in claim 20 or 21 wherein said no load input is an independent input such as an idle switch.

23. A method as claimed in claim 20 or 21 wherein said no load input is inferred from the speed demand input indicating a low or no load demand.

24. A method as claimed in any one of claims 1 to 8 wherein said engine control unit enables controlled engine start sequences based on engine speed feedback and engine speed target.

25. A method as claimed in claim 24 wherein said controlled engine start sequence controls engine speed to idle speed irrespective of the engine speed target.

26. A method as claimed in any one of claims 1 to 8 wherein said engine control unit controls engine speed above engine stall speed.

27. A method as claimed in any one of claims 1 to 8 wherein said flight control system implements a stepped airflow control strategy with closed loop fuelling control being used to provide a finer control over air fuel ratio.

28. A method as claimed in claim 27 wherein a solenoid provides a predetermined number of coarse independent air flow ranges with closed loop fuelling control being used to provide finer air fuel ratio control.

29. A method as claimed in any one of claims 1 to 8 wherein the engine control unit controls engine speed taking into account a range of engine operating conditions including engine temperature and outside air temperature.

30. A system for operating an unmanned aerial vehicle having a flight control system comprising:
   a flight controller for implementing a flight control strategy; and
   an engine control unit interfaced with said flight controller for controlling engine operation,
   wherein said flight control system includes means for setting an engine speed target in response to one, or more signals communicated by said flight controller to said engine control unit which includes engine speed control means for controlling said engine to achieve said engine speed target by closed loop control over fuelling without requiring throttle position control.

31. A system as claimed in claim 30 wherein said flight controller relays said engine speed target to said engine control unit through an analogue or controller area network (CAN) or CAN-bus link.

* * * * *